United States Patent [19]

Light

[11] Patent Number: 4,810,744
[45] Date of Patent: Mar. 7, 1989

[54] INJECTION MOLDABLE GLASS FIBER REINFORCED POLYESTER WITH IMPROVED SURFACE FINISHES

[75] Inventor: Ronald R. Light, Kingsport, Tenn.

[73] Assignee: Eastman Kodak Company, Rochester, N.Y.

[21] Appl. No.: 177,201

[22] Filed: Apr. 4, 1988

[51] Int. Cl.$^4$ ................................................ C08K 3/40
[52] U.S. Cl. .................................... 524/494; 524/513
[58] Field of Search ................................ 524/494, 513

[56] References Cited

U.S. PATENT DOCUMENTS

| | | | |
|---|---|---|---|
| 3,435,093 | 3/1969 | Cope | 260/857 |
| 4,352,904 | 10/1982 | Deyrup | 524/292 |
| 4,401,792 | 8/1983 | Axelrod et al. | 524/513 |
| 4,486,564 | 12/1984 | Deyrup | 523/308 |

Primary Examiner—Lewis T. Jacobs
Attorney, Agent, or Firm—John F. Stevens; William P. Heath, Jr.

[57] ABSTRACT

A glass fiber reinforced poly(ethylene terephthalate) resin, comprising:
  (i) a poly(ethylene terephthalate) resin;
  (ii) 10 to 60 weight % of reinforced glass fibers; and
  (iii) 0.1 to 10 weight % of a nucleating agent comprising:
    (a) a Group I, II, or IV metal cation salt of an ethylene/methacrylic acid copolymer resin having a melt flow index of from about 0.5 g/10 minutes to about 150 g/10 minutes measured at 190° C. under a 10,128-gram load, and
    (b) a Group I, II, or IV metal cation salt of an ethylene/acrylic acid copolymer resin having a melt flow index of from about 0.5 g/10 minutes to about 150 g/10 minutes measured at 190° C. under a 2,160-gram load.

17 Claims, No Drawings

INJECTION MOLDABLE GLASS FIBER REINFORCED POLYESTER WITH IMPROVED SURFACE FINISHES

BACKGROUND OF THE INVENTION

1. Field of the Invention

The present invention relates to injection moldable poly(ethylene terephthalate) resin (PET) compositions containing reinforcing glass fibers. More specifically, the invention is directed to reinforced PET resins which have unexpectedly smooth surfaces when molded.

2. Discussion of the Background

Poly(ethylene terephthalate) resins have been known and commercially available since the mid 1960's. PET resins have useful barrier properties and can be easily injection molded and reinforced with glass fiber materials.

A continuing problem associated with the use of PET resins is the ability to achieve satisfactory parts having good surface smoothness from glass reinforced PET resins at molding temperatures below about 110° C. One approach to this problem has been the use of mold releasing agents to facilitate release of the molded resin from the mold.

Other attempts to solve the surface smoothness problem have centered on the difficulties arising from the slow crystallization rate of the polymers at temperatures below about 110° C. Crystallization promoting agents such as polyoxyalkylene chains having pendant epoxy groups and particulate nucleating agents have been utilized to enhance the crystallization rate of the glass fiber reinforced PET resins to allow the material to be molded in molds heated to temperatures less than 110° C. and yet maintain a smooth glossy finish.

U.S. Pat. No. 3,435,093 discloses the use of poly(ethylene terephthalate) resins containing ionic hydrocarbon copolymers of an α-olefin, and α,β-ethylenically unsaturated carboxylic acids which have been at least partially neutralized. The acid groups of the ionic copolymer are randomly distributed along the polymer chain and can be neutralized from 0% to 100% with metal cations such as Na, K, Ca, Mg, Zn, and Pb.

U.S. Pat. Nos. 4,486,564 and 4,352,904 disclose PET blends containing, in general, from about 0.5 to 12 weight % of the salt of an ethylene/methacrylic acid copolymer as well as about 1 to 12 weight % of a low molecular weight organic ester, ketone, sulfone, sulfoxide, nitrile, or amide. The low molecular weight compounds are required to obtain a high surface gloss and function by improving the mobility of the PET resin in its supercooled state by reducing the viscosity of the supercooled mixture. Both the ethylene/methacrylic acid copolymer salt and the low molecular weight mobility additive are required to obtain a high surface gloss and smoothness.

A need still exists, however, for an inexpensive simple method of producing glass reinforced poly(ethylene terephthalate) resins with smooth and glossy surfaces at mold temperatures less than about 110° C.

SUMMARY OF THE INVENTION

Accordingly, one object of the present invention is to prepare a glass reinforced poly(ethylene terephthalate) resin without the need for low molecular weight lubricants, plasticizers or mobility agents.

Another object of the invention is to prepare glass reinforced poly(ethylene terephthalate) resins having glossy smooth surfaces at temperatures below about 110° C. by an economical and low-cost procédure.

These and other objects which become apparent from the following specification, have been achieved by the present glass reinforced polyethylene terephthalate resins which comprise:

(i) a poly(ethylene terephthalate) resin;
(ii) about 10 weight % to about 60 weight % of reinforcing glass Fibers; and
(iii) about 0.1 weight % to about 10 weight % of a nucleating agent comprising:
(a) a Group I, II, or IV metal cation salt of an ethylene/methacrylic acid copolymer resin having a melt flow index of from about 0.5 g/10 minutes to about 150 g/10 minutes measured at 190° C. under a 10,128-gram load, and
(b) a Group I, II, or IV metal cation salt of an ethylene/acrylic acid copolymer resin having a melt flow index of from about 0.5 g/10 minutes to about 150 g/10 minutes measured at 190° C. under a 2,160-gram load.

DETAILED DESCRIPTION OF THE PREFERRED EMBODIMENTS

In order to achieve a smooth surface in poly(ethylene terephthalate) (PET) molded parts heated to less than 110° C., conventional practice is to use ionic hydrocarbon copolymers as nucleating agents in combination with low molecular weight organic ester plasticizers to ensure adequate crystallization rates. The present invention represents the unexpected discovery that combinations of specific and different ionic hydrocarbon copolymers of α-olefin and α,β-ethylenically unsaturated carboxylic acids will provide an injection moldable glass fiber reinforced poly(ethylene terephthalate) resin which has smooth surfaces when molded at temperatures below 110° C., i.e., in a 95° C. mold, without the aid of low molecular weight lubricants or plasticizers. The inventors have surprisingly discovered that the desired surface smoothness results can be achieved without using the combinations of a nucleating agent with a low molecular weight plasticizer as taught by the prior art. Molded glass fiber reinforced PET resins having excellent surface smoothness according to the present invention are obtained using only the combination of different ratios of molecular weights of the respective nucleating agents.

The inventive glass fiber reinforced PET resin compositions consist of a poly(ethylene terephthalate) resin, glass fiber reinforcement, and combinations of nucleating agents consisting of a metal salt of a low flow rate ethylene/methacrylic acid copolymer with the metal salt of a high flow rate ethylene/acrylic acid copolymer. By "low flow rate" is meant a melt flow rate of about 10 g/10 minutes or less as measured at 190° C. and under a 10,128-gram load. By "high flow rate" is meant a melt flow rate of between about 20 to 100 g/10 minutes as measured at 190° C. under a 2,160-gram load. A preferred range for the flow rate of the ethylene/methacrylic acid copolymer is from 3 to 10 g/10 minutes, although copolymers having flow rates slightly higher or lower than this range are still suitable for use in the present invention. Particularly preferred low flow rate copolymers have a melt flow rate of about 7.7 g/10 minutes (190° C., 10,128-gram load). A particularly preferred high flow rate copolymer has a melt flow rate of about 32.3 g/10 minutes (190° C., 2,160-gram load).

The PET resins which are suitable for use in the present invention are well known to those skilled in the art and can be prepared by well known processes such as transesterification or direct esterification of terephthalic acid and ethylene glycol. The PET resins of the present invention preferably have an inherent viscosity of from about 0.4 dl/g to about 1.0 dl/g as measured at 0.5 g concentration in 100 mL of a 60/40 mixture of phenol/tetrachloroethane. Preferred PET resins have an inherent viscosity of about 0.6 dl/g measured under the same conditions.

The PET resins of the present invention may be comprised substantially of ethylene glycol and terephthalate acid monomer units or may comprise up to about 5 weight % of copolymerizable acid and/or glycol monomers. A particularly preferred acid comonomer is isophthalic acid. Particularly preferred copolymerizable glycols include 1,4-butanediol and 1,4-cyclohexylene dimethanol. When the amount of copolymerizable acid and/or glycol exceeds about 5 weight % of the PET resin composition, the crystallization properties of the resin are degraded and smooth surfaces are difficult to obtain at low molding temperatures.

The nucleating agents of the present invention are based on copolymers of ethylene/methacrylic acid and ethylene/acrylic acid which have been neutralized with a metal salt chosen from one of Groups I, II, or IV of the periodic table. The carboxylic acid groups on the copolymer chains are randomly distributed and the concentration of carboxyl groups may vary from about 3 to about 40% of the copolymer. A preferred carboxyl group concentration is from 10% to 20%. The carboxylic acid groups can be neutralized from about 10% to 100% but are preferably neutralized to about 40% to 80%. Although the metal cations of the neutralized copolymers may be taken from any of Groups I, II, or IV of the periodic table, the preferred metal cations are Na, K, Ca, Mg, Zn, and Pb with the most preferred cations being Na and K.

The melt flow rate of the neutralized ethylene/methacrylic acid copolymer nucleating agent is preferably in the range of 0.5 g/10 minutes to about 150 g/10 minutes as measured at 190° C. under a 10,128-gram load. A preferred melt flow rate for the ethylene/methacrylic acid copolymer is from 1 g/10 minutes to about 100 g/10 minutes. The melt flow index of the neutralized ethylene/acrylic acid copolymer should be in the range of 0.5 g/10 minutes to about 150 g/10 minutes as measured at 190° C. under a 2,160-gram load, preferably in the range of 1 g/10 minutes to about 100 g/10 minutes.

The preferred concentration range for the combination of the ethylene/methacrylic acid copolymer metal salt and the ethylene/acrylic acid metal salt is from about 0.1 to about 10 weight %, preferably in the range of 0.1 to 5.0 weight %. The relative ratio of the ethylene/methacrylic copolymer salt to the ethylene/acrylic acid copolymer salt is preferably in the range of from about 4:1 to about 1:4.

PET resin compositions containing only the ethylene/acrylic acid copolymer salt exhibit good molding properties and can be produced with glossy smooth surfaces. However, the physical properties of the PET resin composition such as toughness, temperature resistance, and strength are severely degraded relative to PET compositions comprising both the ethylene/acrylic acid and ethylene/methacrylic acid metal salts. PET resin compositions containing only the ethylene/methacrylic acid copolymer salt retain good physical properties, but cannot be molded at low temperatures to produce molded parts having a smooth glossy surface. Accordingly, both the ethylene/methacrylic acid and the ethylene/acrylic acid copolymer salts must be present in the amounts and ratios noted above to prepare a molded PET resin article having a smooth and glossy surface at low temperatures.

The glass fiber reinforcement may be any form of glass fiber reinforcement conventionally used with thermoplastic resins, such as, for example, glass fibers, glass whiskers, glass threads, etc. The glass fiber reinforcement concentration can vary from about 10 weight % to about 60 weight %, but is preferably about 10 weight % to about 55 weight %. The preferred form of the glass fiber reinforcement is chopped glass strands having a length of from about ⅛ inch to about 2 inches. Preferred glass fiber lengths are from ⅛ inch to about ¾ inch. Chopped glass fibers are well known in the art and commercially available.

In addition to the glass fiber reinforcement, the composition may also contain other additives and fillers such as pigments, talc, chalk, asbestos, and titanium dioxide. Additionally, additives such as flame retardants, stabilizers, processing aids and colorants may also be added to the composition. Additional additives can be generally added in amounts up to about 20 weight % of the total composition.

The glass fiber reinforced compositions of the present invention may be processed by conventional molding and forming techniques such as injection molding, blow molding, and extrusion processing. The synthetic polymer components of these blends can be prepared separately and then subsequently blended by techniques such as melt extrusion or batch mixing. Alternatively, all components of the blend can be blended together at the same time.

Other features of the invention will become apparent in the course of the following descriptions of exemplary embodiments which are given for illustration of the invention and are not intended to be limiting thereof.

EXAMPLES

EXAMPLE 1 (Control)

Dried poly(ethylene terephthalate) having an inherent viscosity of about 0.62 was mixed with 30 weight %, ⅛-inch glass fibers, based on the total weight, 5 weight % ethylene/methacrylic acid copolymer (90/10 by weight) which had been 80% neutralized with sodium (melt flow=7.7 g/10 minutes), 1.0 weight % of a Phenoxy Resin (thermal stabilizer sold by Union Carbide) and 0.5 weight % of a phenolic antioxidant. The mixture was then extruded on a 1½-inch single screw extruder at a temperature of about 265° C. and chopped into pellets. The resin pellets were dried at about 150° C. for 4 hours and molded on a BOY 50S injection molding machine at a set temperature of 275° C. The surface temperature of the mold was measured to be 95° C. Surface texture was measured in several places along the length of a tensile bar using the arithmetic mean version of the SURTRONIC 10 surface instrument manufactured by Rank Taylor Hobson Limited of Leicester, England. The surface roughness averaged about 33 micro-inches for this example when molded under the given conditions.

EXAMPLE 2

A PET resin, as described in Example 1, was mixed with 30 weight %, ⅛-inch glass fibers, 4.75 weight % (based on the total weight of composition) of 80% sodium neutralized 90/10 ethylene/methacrylic acid copolymer (melt flow=7.7 g/10 minutes), 0.25 weight % of a 80% sodium neutralized 80/20 ethylene/acrylic acid copolymer (melt flow =32.3 g/10 minutes), 1.0 weight % of a Phenoxy Resin and 0.5 weight % of a phenolic antioxidant. The mixture was compounded, molded and tested as described in Example 1. Surprisingly, the surface texture of the specimen was observed to be much smoother than that described in Example 1. The surface roughness was measured with the SURTRONIC 10 instrument to be 10 micro-inches. These results were obtained without deleteriously affecting the mechanical properties of the product (see Tables 1 and 2).

EXAMPLE 3

PET, as described in Example 1, was mixed with 30 weight % glass fibers, 4.50 weight % (based on total weight of composition) of 80% sodium neutralized 90/10 ethylene/methacrylic acid copolymer (melt flow=7.7 g/10 minutes), 0.50 weight % of a 80% sodium neutralized 80/20 ethylene/acrylic acid copolymer (melt flow=32.3 g/10 minutes), 1.0 weight % of a Phenoxy Resin and 0.5 weight % of a phenolic antioxidant. Again, it was totally unexpected to find the surface texture of the specimen to be much smoother than those described in Example 1. The surface roughness was found to be 14 micro-inches and the Example has excellent mechanical properties (Tables 1 and 2).

EXAMPLE 4

PET, as described in Example 1, was mixed with 30 weight % glass fibers, 4.25 weight % (based on total weight of composition) of 80% sodium neutralized 90/10 ethylene/methacrylic acid copolymer (melt flow=7.7 g/10 minutes), 0.75 weight % of a 50% sodium neutralized 80/20 ethylene/acrylic acid copolymer (melt flow=32.3 g/10 minutes), 1.0 weight % of a Phenoxy Resin and 0.5 weight % of a phenolic antioxidant The surface texture on specimen molded from this mixture was again, unexpectedly, smooth when molded under the same conditions as described in Example 1. The surface roughness was measured to have an average value of 8 micro-inches which is about 1/4 the value found for the control sample mentioned previously (Example 1). Again, this was accomplished without deleteriously affecting the mechanical properties of the composition.

EXAMPLE 5

PET as described in Example 1, was mixed with 30 weight % glass fibers, 4.00 weight % (based on total weight of composition) of 80% sodium neutralized 90/10 ethylene/methacrylic acid copolymer (melt flow=7.7 g/10 minutes), 1.00 weight % of a 80% sodium neutralized 80/20 ethylene/acrylic acid copolymer (melt flow=32.3 g/10 minutes), 1.0 weight % of a Phenoxy Resin and 0.5 weight % of a phenolic antioxidant. Again, the surface texture of the specimen molded from this mixture was much smoother than those described in Example 1. The surface roughness was measured to be 10 micro-inches when the composition was molded under the same conditions. Again, the mechanical properties were not deleteriously affected by using these combinations of nucleating agents to improve the surface texture of molded parts when molded into molds heated to less than 110° C.

TABLE 1

GLASS FIBER REINFORCED PET CONTAINING COMPOSITIONS WITH IONIC HYDROCARBON COPOLYMER NUCLEATING AGENTS

| COMPOSITION | | | | |
|---|---|---|---|---|
| | 63.5 Wt. % PET | 63.5 Wt. % PET | 63.5 Wt. % PET | 63.5 Wt. % PET |
| | 30 Wt. % Glass | 30 Wt. % Glass | 30 Wt. % Glass | 30 Wt. % Glass |
| | 5 Wt. % Surlyn 8527[1] | 4.75 Wt. % Surlyn 8527 | 4.50 Wt. % Surlyn 8527 | 4.25 Wt. % Surlyn 8527 |
| | | 0.25 Wt. % Aclyn 285[3] | 0.50 Wt. % Aclyn 285 | 0.75 Wt. % Aclyn 285 |
| | 1.0 Wt. % Phenoxy | 1.0 Wt. % Phenoxy | 1.0 Wt. % Phenoxy | 1.0 Wt. % Phenoxy |
| | 0.5 Wt. % Irg. 1010[2] | 0.5 Wt. % Irg. 1010 | 0.5 Wt. % Irg. 1010 | 0.5 Wt. % Irg. 1010 |
| Cycle Temperature/Press (°C./psig) | 275/300 | 275/300 | 275/300 | 275/300 |
| Mold Temperature (°C.) | 95 | 95 | 95 | 95 |
| Ash Content (Wt. %) | 29.2 | 28.4 | 29.9 | 29.7 |
| Density by Buoyancy | 1.546 | 1.533 | 1.523 | 1.523 |
| Tensile Strength at Fracture (psi) | 24,600 | 22,500 | 22,500 | 21,100 |
| Elong at Fracture (%) | 5 | 5 | 5 | 4 |
| Flexural Modulus (psi) | 1,370,000 | 1,230,000 | 1,256,000 | 1,287,000 |
| Flexural Strength (psi) | 37,700 | 32,800 | 33,600 | 33,600 |
| Izod Impact, Net | | | | |
| (Ft-Lb/In) 23° C. | 2.1 | 2.0 | 2.0 | 2.0 |
| −40° C. | 2.1 | 2.0 | 2.0 | 2.0 |
| Unnotched 23° C. | 19.0 | 15.4 | 15.4 | 13.9 |
| Ft-Lb/In −40° C. | 17.9 | 11.8 | 12.5 | 11.6 |
| HDT (264 psi °C.) | 223 | 222 | 222 | 223 |
| Mold Shrinkage (%) | 0.19 | 0.12 | 0.20 | 0.19 |
| Surface Roughness (Micro-Inches) | 33 | 10 | 14 | 8 |

[1] An Ethylene/Methacrylic Acid Copolymer (90/10) Salt 80% Neutralized With Na.
[2] Phenolic Antioxidant.
[3] An Ethylene/Acrylic Acid Copolymer (80/20) Salt 80% Neutralized With Na.

TABLE 2
GLASS FIBER REINFORCED PET CONTAINING COMPOSITIONS OF IONIC HYDROCARBON COPOLYMER NUCLEATING AGENTS

| COMPOSITION | 63.5 Wt. % PET<br>30 Wt. % Glass<br>5 Wt. % Surlyn 8527<br>1.0 Wt. % Phenoxy<br>0.5 Wt. % Irg. 1010 | 63.5 Wt. % PET<br>30 Wt. % Glass<br>4.0 Wt. % Surlyn 8527<br>1.00 Wt. % Aclyn 285<br>1.0 Wt. % Phenoxy<br>0.5 Wt. % Irg. 1010 |
|---|---|---|
| Cycle Temperature/Press (°C./psig) | 275/300 | 275/300 |
| Mold Temperature (°C.) | 95 | 95 |
| Ash Content (Wt. %) | 29.2 | 29.6 |
| Density by Buoyancy | 1.546 | 1.553 |
| Tensile Strength at Fracture (psi) | 24,600 | 23,500 |
| Elong at Fracture (%) | 5 | 5 |
| Flexural Modulus (psi) | 1,370,000 | 1,360,000 |
| Flexural Strength (psi) | 37,700 | 36,000 |
| Izod Impact, | | |
| Notched (Ft-Lb/In) | | |
| 23° C. | 2.1 | 1.9 |
| −40° C. | 2.1 | 1.9 |
| Unnotched (Ft-Lb/In) | | |
| 23° C. | 19.0 | 12.7 |
| −40° C. | 17.9 | 13.9 |
| HDT (264 psi °C.) | 223 | — |
| Mold Shrinkage (%) | 0.19 | 0.16 |
| Surface Roughness (Micro-Inches) | 33 | 10 |

As used herein, the inherent viscosity (I.V.) is measured at 25° C. using 0.50 g of polymer per 100 mL of a solvent consisting of 60% by weight phenol and 40% by weight tetrachloroethane.

Surface smoothness is measured by taking several measurements along the length of the tensile bars using the Ra (arithmetic mean) version of a Surtronic 10 surface instrument manufactured by Tank Taylor Hobson Limited of Leicester, England. Surface smoothness is indicated in micro-inches, and is a conventional measurement of variations in the surface in a direction normal thereto.

The tests used herein for determination of mechanical properties are described as follows:

| Melt Flow Rate or Index | ASTM D1238-79 |
|---|---|
| Tensile Strength at Fracture | ASTM D638-80 |
| Elongation at Fracture | ASTM D638-80 |
| Flexural Modulus | ASTM D790-80 |
| Flexural Strength | ASTM D790-80 |
| Izod Impact | ASTM D256-81 |
| Heat Deflection Temperature, °C. | ASTM D648-72 |

Unless otherwise specified, all parts, percentages, ratios, etc., are by weight. Weight of reinforcing glass fibers and nucleating agent(s) are based on total composition weight.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters patent of the United States is:

1. A glass fiber reinforced poly(ethylene terephthalate) resin composition comprising:
   (i) a poly(ethylene terephthalate) resin;
   (ii) 10 to 60 weight % of reinforcing glass fibers; and
   (iii) 0.1 to 10 weight % of a nucleating agent comprising:
      (a) a Group I, II, or IV metal cation salt of an ethylene/methacrylic acid copolymer resin having a melt flow index of from about 0.5 g/10 minutes to about 150 g/10 minutes measured at 190° C. under a 10,128-gram load, and
      (b) a Group I, II, or IV metal cation salt of an ethylene/acrylic acid copolymer resin having a melt flow index of from about 0.5 g/10 minutes to about 150 g/10 minutes measured at 190° C. under a 2,160-gram load.

2. The resin composition of claim 1, wherein said poly(ethylene terephthalate) resin has an inherent viscosity of from about 0.4 dl/g to about 1.0 dl/g as measured at 0.5 g concentration in 100 mL of a 60/40 mixture of phenol/tetrachloroethane.

3. The resin composition of claim 2, wherein said inherent viscosity is about 0.6 dl/g.

4. The resin composition of claim 1, wherein said metal cation is selected from the group consisting of Na, K, Ca, Mg, Zn, and Pb.

5. The resin composition of claim 4, wherein said metal cation is Na or K.

6. The resin composition of claim 1, wherein the melt flow rate of said ethylene/methacrylic acid copolymer salt is from about 1 g/10 minutes to about 100 g/10 minutes.

7. The resin composition of claim 1, wherein the melt flow rate of said ethylene/acrylic acid copolymer salt is from about 1 g/10 minutes to about 100 g/10 minutes.

8. The resin composition of claim 1, wherein said nucleating agent is present in an amount from about 0.1 weight % to about 5.0 weight %.

9. The resin composition of claim 1, wherein said glass fiber reinforcement is present in an amount from about 10 weight % to about 55 weight %.

10. The resin composition of claim 1, wherein the ratio of said ethylene/methacrylic acid copolymer salt to said ethylene/acrylic acid copolymer salt is from 4:1 to 1:4.

11. The resin composition of claim 1, wherein said ethylene/methacrylic acid copolymer salt and said ethylene/acrylic acid copolymer salt have an ethylene to acid ratio of from about 95:5 to about 70:30.

12. The resin composition of claim 11, wherein said ethylene to acid ratio is from 90:10 to 80:20.

13. The resin composition of claim 1, wherein said glass fibers have a length ranging from ⅛ inch to 2 inches.

14. The resin composition of claim 1, wherein 3% to 40% of the acid groups on said ethylene/methacrylic acid copolymer salt and said ethylene/acrylic acid copolymer salt are in the metal salt form.

15. The resin composition of claim 14, wherein 10% to 20% of said acid groups are in the metal salt form.

16. The resin composition of claim 1, wherein said poly(ethylene terephthalate) resin comprises up to 5 weight % of a copolymerizable acid or glycol monomer.

17. The resin composition of claim 16, wherein said copolymerizable monomer is selected from the group consisting of isophthalic acid; 1,4 butanediol; 1,4-cyclohexane dimethanol; naphthalene 1,4- or 2,6-dicarboxylic, bibenzoic, adipic, sebacic, decane-1,10-dicarboxylic, diglycolic, or p-hydroxybenzoic acids; diethylene glycol, propane-1,3-diol, polytetramethylene glycol, polyethylene glycol, polypropylene glycol, or neopentyl glycol.

* * * * *